United States Patent
Choi et al.

(10) Patent No.: US 10,558,763 B2
(45) Date of Patent: Feb. 11, 2020

(54) AUTOMATIC TRANSLATION SYSTEM, DEVICE, AND METHOD

(71) Applicant: Electronics and Telecommunications Research Institute, Daejeon (KR)

(72) Inventors: Mu Yeol Choi, Daejeon (KR); Min Kyu Lee, Daejeon (KR); Sang Hun Kim, Sejong-si (KR); Seung Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 44 days.

(21) Appl. No.: 16/014,203

(22) Filed: Jun. 21, 2018

(65) Prior Publication Data

US 2019/0042565 A1    Feb. 7, 2019

(30) Foreign Application Priority Data

Aug. 3, 2017 (KR) .................. 10-2017-0098499
Apr. 13, 2018 (KR) .................. 10-2018-0043284

(51) Int. Cl.
| | |
|---|---|
| G06F 17/28 | (2006.01) |
| G10L 21/0208 | (2013.01) |
| G10L 25/84 | (2013.01) |
| G10L 25/93 | (2013.01) |
| G10L 25/69 | (2013.01) |
| G10L 21/0216 | (2013.01) |

(52) U.S. Cl.
CPC ........ *G06F 17/289* (2013.01); *G10L 21/0208* (2013.01); *G10L 25/69* (2013.01); *G10L 25/84* (2013.01); *G10L 25/93* (2013.01); *G10L 2021/02165* (2013.01)

(58) Field of Classification Search
CPC ... G06F 17/289; G10L 21/0208; G10L 25/69; G10L 25/84; G10L 25/93
USPC ......................................................... 704/2–9
See application file for complete search history.

(56) References Cited

U.S. PATENT DOCUMENTS

| | | | |
|---|---|---|---|
| 9,818,427 B2* | 11/2017 | Cahill | G10L 21/028 |
| 2013/0024194 A1 | 1/2013 | Zhao et al. | |
| 2013/0297304 A1 | 11/2013 | Kim et al. | |
| 2015/0227510 A1 | 8/2015 | Shin et al. | |
| 2016/0283469 A1* | 9/2016 | Gold | G06F 17/289 |
| 2018/0343514 A1* | 11/2018 | Dusan | H04R 1/1083 |
| 2019/0026266 A1* | 1/2019 | Mochida | G06F 3/167 |

* cited by examiner

*Primary Examiner* — Md S Elahee
(74) *Attorney, Agent, or Firm* — Kile Park Reed & Houtteman PLLC (57) ABSTRACT

An automatic translation device includes a communications module transmitting and receiving data to and from an ear-set device including a speaker, a first microphone, and a second microphone, a memory storing a program generating a result of translation using a dual-channel audio signal, and a processor executing the program stored in the memory. When the program is executed, the processor compares a first audio signal including a voice signal of a user, received using the first microphone, with a second audio signal including a noise signal and the voice signal of the user, received using the second microphone, and entirely or selectively extracting the voice signal of the user from the first and second audio signals, based on a result of the comparison, to perform automatic translation.

18 Claims, 8 Drawing Sheets

AUTOMATIC TRANSLATION SYSTEM, DEVICE, AND METHOD

CROSS REFERENCE TO RELATED APPLICATION

The present application claims priority to Korean Patent Application Number 10-2017-0098499 filed on Aug. 3, 2017, and Korean Patent Application Number 10-2018-0043284 filed on Apr. 13, 2018, the entire contents of which are incorporated herein for all purposes by this reference.

BACKGROUND

Field

The present disclosure relates to an automatic translation system, device, and method using dual-channel audio signals.

Description

Recently, in response to the development of speech recognition technology, automatic translation functions using smartphones have come into widespread use, and a variety of applications support multilingual services. Although speech recognition performance and multilingual support lead to increased expectation for automatic translation, a desirable level of functionality may not be provided in actual cases in which translation is required.

Automatic translation using smartphones may have the following problems.

First, users typically use a single device to translate two languages. Since this allows users to speak alternately, using the device located therebetween, users can only communicate using simple sentences, i.e. questions and answers, rather than being able to engage in more complex conversation.

Second, when different users use the same application on their respective devices, the inconvenience of alternately speaking while using a single device may be reduced. However, sentences translated from different languages and synthesized voices may not be transferred to a user's counterpart, unless the two devices are linked.

Third, when the devices of different users are paired (or linked) and hands-free ear-sets are used, more complex conversation is possible. However, when two users speak in locations adjacent to each other, a problem of crosstalk, i.e. a phenomenon in which the voice of a user is input to the microphone of the hands-free ear-set of the user's counterpart, may occur.

BRIEF SUMMARY

Various aspects of the present disclosure provide an automatic translation system, device, and method using dual-channel audio signals, preventing vocal interference between conversing persons and enabling speech recognition to not be influenced by external noise, so that a plurality of users can engage in complex conversation in a situation in which automatic translation is provided.

The object of the present disclosure is not limited to the aforementioned description, and other objects not explicitly disclosed herein will be clearly understood by a person skilled in the art from the description provided hereinafter.

According to an aspect, an automatic translation device may include: a communications module transmitting and receiving data to and from an ear-set device including a speaker, a first microphone, and a second microphone; a memory storing a program generating a result of translation using a dual-channel audio signal; and a processor executing the program stored in the memory. When the program is executed, the processor compares a first audio signal including a voice signal of a user, received using the first microphone, with a second audio signal including a noise signal and the voice signal of the user, received using the second microphone, and entirely or selectively extracting the voice signal of the user from the first and second audio signals, based on a result of the comparison, to perform automatic translation.

The first microphone may be located inside of an earbud of the ear-set device, and the second microphone may be located outside of the earbud of the ear-set device, within a predetermined distance from the mouth of the user.

The first and second audio signals may be converted into a mono signal in the ear-set device, the mono signal being received by the communications module. The processor may decode the mono signal to extract the first and second audio signals of the dual-channel audio signal.

The processor may detect an utterance period and a pause period of the user from the first audio signal, detect the noise signal from the second audio signal, in a period corresponding to the detected pause period, and extract the voice signal of the user, based on a signal-to-noise ratio of the detected noise signal.

When the signal-to-noise ratio of the noise signal is in a preset range, the processor may weighted-sum the first and second audio signals, thereby extracting the voice signal of the user from the weighted-summed first and second audio signals.

When the noise signal contains a plurality of noises, the processor may generate the acoustic models corresponding to types of the noises, respectively, and perform the automatic translation using the acoustic models.

When the signal-to-noise ratio of the noise signal is higher than the preset range, the processor may extract the voice signal of the user from the second audio signal to perform the automatic translation.

When the signal-to-noise ratio of the noise signal is lower than the preset range, the processor may extract the voice signal of the user from the first audio signal to perform the automatic translation.

According to another aspect, an automatic translation method may include: receiving first and second audio signals, converted into a mono signal, from an ear-set device of an automatic translation device; decoding the mono signal to a dual-channel audio signal comprised of the first and second audio signals; comparing the first and second audio signals; entirely or selectively extracting a voice signal of a user from the first and second audio signals, based on a result of the comparison; and automatically translating the extracted voice signal of the user. The first audio signal may contain the voice signal of the user, received using a first microphone of the ear-set device, and the second audio signal contains a noise signal and the voice signal of the user, received using a second microphone of the ear-set device The first microphone may be located inside of the ear-set device, and the second microphone may be located outside of the earbud at a predetermined distance from the mouth of the user.

The step of comparing the first and second audio signals may include: detecting an utterance period and a pause period of the user from the first audio signal; and detecting the noise signal from the second audio signal, in a period corresponding to the detected pause period.

The voice signal of the user may be entirely or selectively extracted from the first and second audio signals, based on a signal-to-noise ratio of the detected noise signal.

The step of entirely or selectively extracting the voice signal of the user from the first and second audio signals may include: determining whether or not the signal-to-noise ratio of the noise signal is in a preset range; weighted-summing the first and second audio signals when the signal-to-noise ratio of the noise signal is in the preset range; and extracting the voice signal of the user from the weighted-summed first and second audio signals.

When the noise signal contains a plurality of noises, the automatic translation method may generate the acoustic models corresponding to types of the noises, respectively.

The step of entirely or selectively extracting the voice signal of the user from the first and second audio signals may include: determining whether or not the signal-to-noise ratio of the noise signal is in a preset range; and when the signal-to-noise ratio of the noise signal is determined to be higher than a preset range, extracting the voice signal of the user from the second audio signal.

The step of entirely or selectively extracting the voice signal of the user from the first and second audio signals may include: determining whether or not the signal-to-noise ratio of the noise signal is in a preset range; and when the signal-to-noise ratio of the noise signal is determined to be lower than a preset range, extracting the voice signal of the user from the first audio signal.

According to another aspect, an automatic translation system may include: an ear-set device receiving a first audio signal including a voice signal of a user, using a first microphone located inside of an earbud, receiving a second audio signal including a noise signal and the voice signal of the user, using a second microphone located outside of the earbud, and converting the first and second audio signals to a mono signal to transfer the mono signal; and an automatic translation device receiving the mono signal, extracting the first and second audio signals as a dual-channel audio signal from the mono signal, and entirely or selectively extracting the voice signal of the user from the first and second audio signals, based on a result of comparing the first and second audio signals, to perform automatic translation.

The automatic translation device may detect an utterance period and a pause period of the user from the first audio signal, detect the noise signal from the second audio signal, in a period corresponding to the detected pause period, and extract the voice signal of the user from the first and second audio signals, based on a signal-to-noise ratio of the detected noise signal.

When a signal-to-noise ratio of the noise signal is in a preset range, the automatic translation device may weighted-sum the first and second audio signals, thereby extracting the voice signal of the user from the weighted-summed first and second audio signals.

When the signal-to-noise ratio of the noise signal is higher than the preset range, the automatic translation device may extract the voice signal of the user from the second audio signal to perform the automatic translation. When the signal-to-noise ratio of the noise signal is lower than the preset range, the automatic translation device may extract the voice signal of the user from the first audio signal to perform the automatic translation.

According to exemplary embodiments, it is possible to overcome the problem of crosstalk occurring in an automatic translation situation in which users use a free-interactive speech recognition function.

In addition, it is possible to provide an automatic translation service, the speech recognition performance of which is free from external noise, by generating and applying an acoustic model specialized to a noise period and a noise type using a dual-channel audio signal.

DETAILED DESCRIPTION

Hereinafter, exemplary embodiments of the present disclosure will be described in detail with reference to the accompanying drawings, so that a person skilled in the art to which the present disclosure relates could easily put the present disclosure into practice. The present disclosure should not be construed as being limited to these embodiments and may be embodied in many different forms. In the drawings, those parts that are not essential to the description will be omitted to make the present disclosure clear, and the same reference numerals and symbols will be used to designate the same or like components.

The terms "comprise," "include," "have," and any variations thereof used throughout the specification and the appended Claims are intended to cover a non-exclusive inclusion unless explicitly described to the contrary.

Exemplary embodiments relate to an automatic translation system 1, an automatic translation device 200, and an automatic translation method.

Most smartphone applications in current use to provide an automatic translation function are designed for two persons using different languages to use a single device.

Referring to Korean and English by way of example, when a Korean user speaks, an English translation is output. In contrast, when an English user speaks, a Korean translation is output.

Such communication is not proper conversation, but is a form of minimal communication, in which pronunciation must be unnatural. Thus, in order to provide a translation function in which two persons can speak with each other in a natural manner, the limitations of existing applications, in which two persons view a translation application while holding a device, must be overcome.

First, user hands must be free from a smartphone device performing a translation function. In this regard, an ear-set, replacing a microphone and a speaker of the smartphone device, is required. When two persons speak while wearing ear-sets, words or sentences can be naturally pronounced.

However, a problem that must be solved in terms of speech recognition occurs. Specifically, in a system using a single device, two persons participating in a translated conversation speak alternately, using a microphone of the device. In the case of audio input using the microphone, only the voice of a user, except for noise, is input.

When two users wearing their respective ear-sets converse with each other, not only the voice of one user but also the voice of the user's counterpart may be input to the user's ear-set.

For a naturally translated conversation, the conversing persons need to approach each other to have a distance of 1 meter or less therebetween. Recently, due to the high sensitivity of microphones in ear-sets, the microphone of a user's ear-set can respond to the voice of the user's counterpart.

For example, in the case of Korean-English translation, words or a sentence pronounced by a Korean speaker are input to one language recognizer, i.e. a Korean recognizer, through the ear-set worn by the Korean speaker and are simultaneously input to the other language recognizer, i.e. an English recognizer, through the ear-set worn by the English speaking counterpart, or vice versa. In this case, the language recognizers of the counterparts may malfunction, so that translation may not be properly performed.

In order to overcome such a critical problem, a crosstalk prevention function is required.

Existing crosstalk prevention methods may include language recognition technology. According to such language recognition technology, the languages of users are recognized, and only a specific language is received as an input of a corresponding language recognizer. Consequently, only a single language can be input to a single language recognizer. However, the language recognition technology may fail to provide translation when a language recognition error occurs.

In addition, a method of simultaneously operating a plurality of language recognizers for a plurality of preset languages may be used, in consideration of such a language recognition failure. However, since it may be difficult to previously set the languages of users, a translation function may be limited.

In order to overcome the crosstalk problem, the automatic translation system 1, the automatic translation device 200, and the automatic translation method according to exemplary embodiments allow two or more users to properly converse in a situation in which automatic translation is provided, using a pronunciation recognition function, in which a microphone 120 of an ear-set device 100 can only activate a speech recognition function in response to the pronunciation of the user of the ear-set device 100.

Hereinafter, the automatic translation system 1, the automatic translation device 200, and the automatic translation method according to exemplary embodiments will be described with reference to FIGS. 1 to 6.

Figure 1:
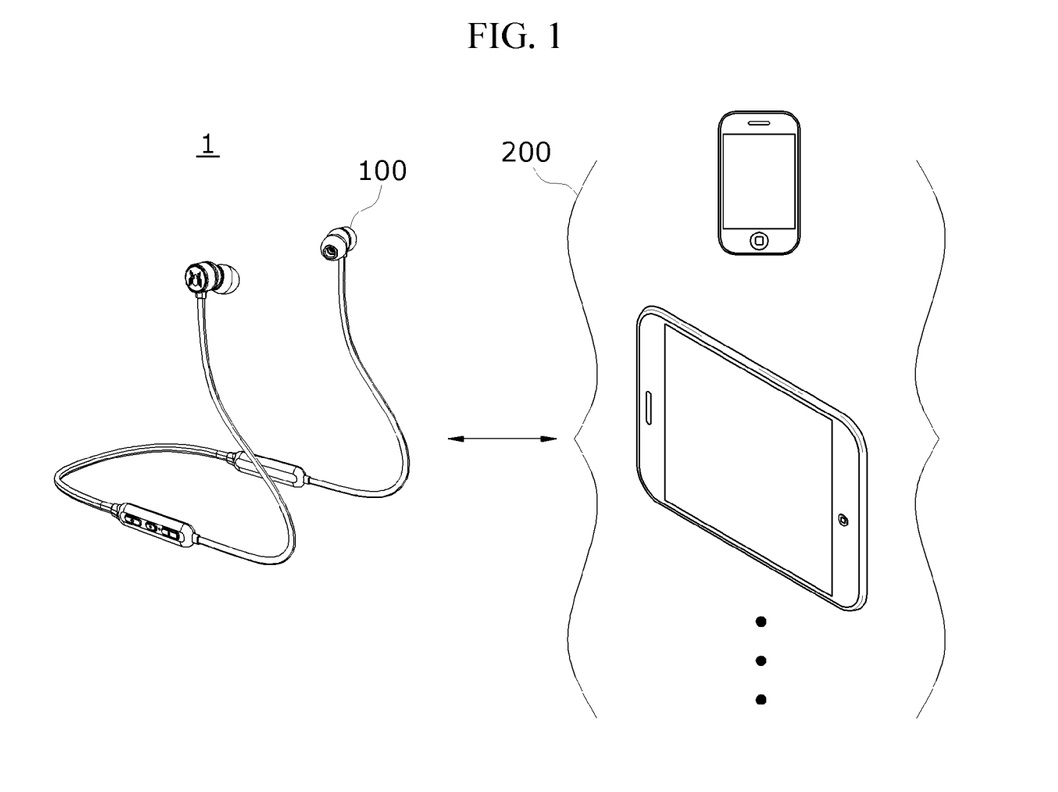
FIG. 1 is a perspective view illustrating an automatic translation system according to exemplary embodiments.

FIG. 1 is a perspective view illustrating the automatic translation system 1 according to exemplary embodiments.

The automatic translation system 1 according to exemplary embodiments includes the ear-set device 100 and the automatic translation device 200.

The ear-set device 100 may be a hands-free ear-set device. Although the ear-set device 100 may be paired with the automatic translation device 200 via Bluetooth low energy (BLE), the pairing system is not limited to Bluetooth.

When a dual-channel audio signal is received from the ear-set device 100, the automatic translation device 200 extracts a voice signal of a user by decoding the received signal and then performs automatic translation thereof.

The automatic translation device 200 is an intelligent terminal, i.e. a mobile terminal to which computer support functions, such as Internet communications and information search, are added. The automatic translation device 200 may be a mobile phone, a smartphone, a tablet computer, a smart watch, a wearable terminal, other mobile communications terminals, or the like, which can operate a number of programs (i.e. applications) desired by users, installed therein.

Figure 2:
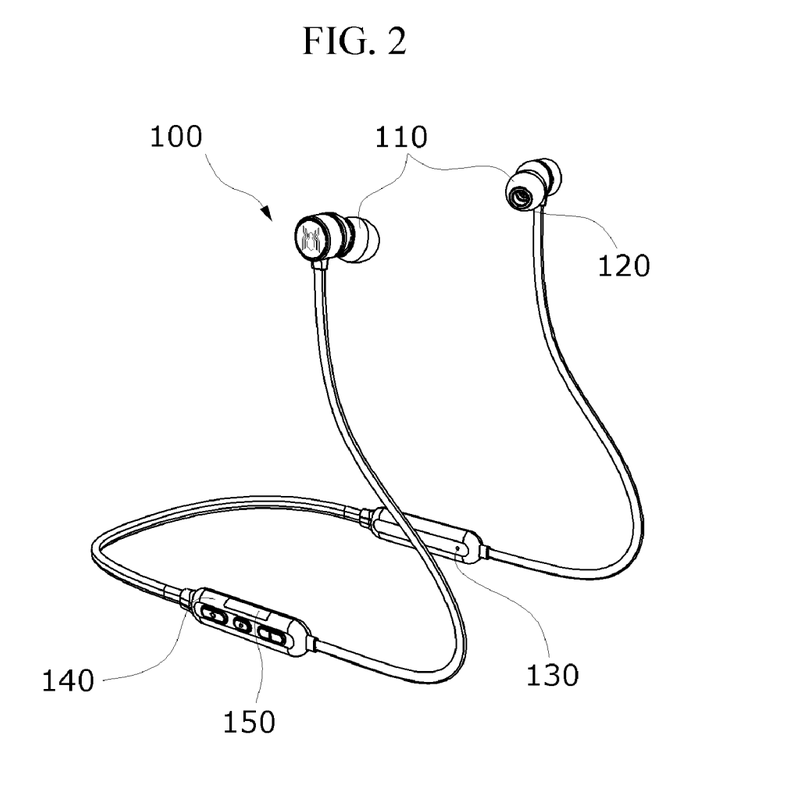
FIG. 2 is a perspective view illustrating an exemplary configuration of the ear-set device.
Figure 3:
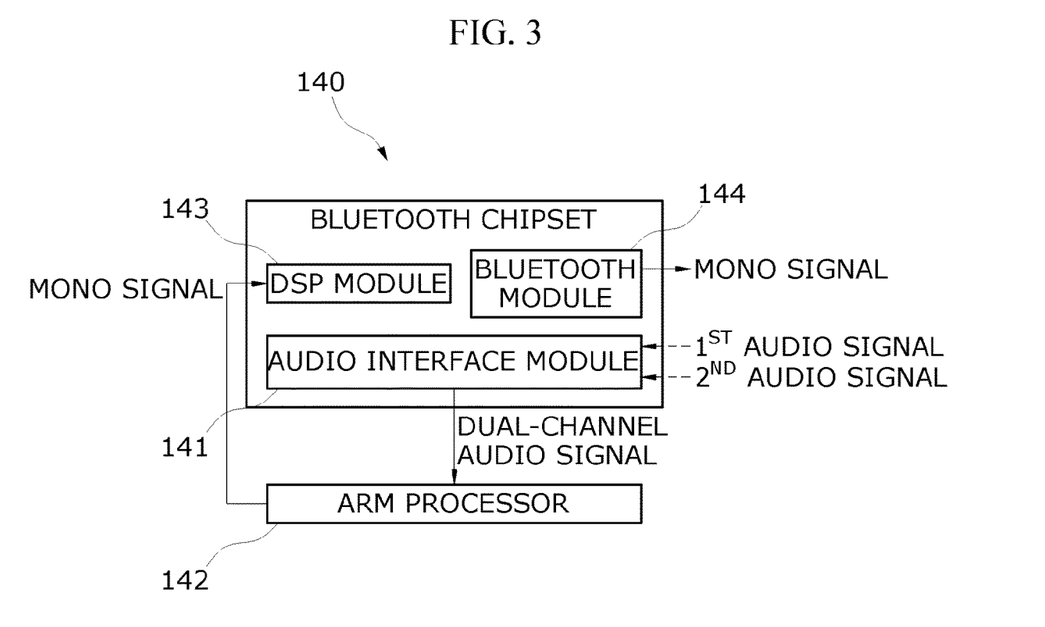
FIG. 3 is a block diagram of the ear-set device.
Figure 4:
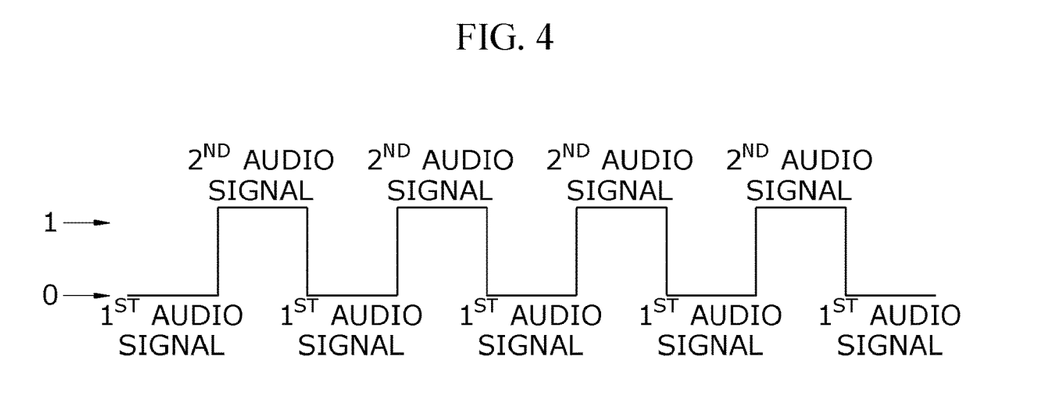
FIG. 4 is a waveform diagram illustrating a mono signal.

FIG. 2 is a perspective view illustrating an exemplary configuration of the ear-set device 100, FIG. 3 is a block diagram of the ear-set device 100, and FIG. 4 is a diagram illustrating a mono signal or a mono-channel signal.

As illustrated in FIG. 2, the ear-set device 100 according to exemplary embodiments includes speakers and a first microphone 120 located inside of earbuds 110, a second microphone 130 located outside of the earbuds 110, a Bluetooth chipset 140, and a battery 150.

Although the ear-set device 100 may be a Bluetooth neckband type ear-set, the present disclosure is not necessarily limited thereto. The ear-set device may be any ear-set device provided with speakers and microphones.

The neckband type ear-set device 100 is configured to be worn around the neck of a user, and includes two earbuds 110 fitting inside the ears of the user. The speakers are provided in the two earbuds 110, respectively. The first microphone 120 receiving a first audio signal, a voice of a user, is provided inside of one or more earbuds 110. Since the first microphone 120 is located inside of the earbud 110, most of external noise is blocked, and the first microphone 120 can receive the voice of the user wearing the ear-set device 100 relatively clearly.

Here, the sound quality of the first audio signal acquired using the first microphone 120 in the earbud 110 is significantly lower than that of an audio signal acquired using a common microphone.

In this regard, the ear-set device 100 according to exemplary embodiments uses the second microphone 130 located outside of the earbuds 110, in addition to the first microphone 120, in order to improve speech recognition performance by using a dual-channel audio signal.

The second microphone 130 receives a second audio signal, including a noise signal and a voice of the user. The noise signal is referred to as an audio signal including external noise and the voice of the user's counterpart and the voice of the user wearing the ear-set device 100.

The second microphone 130 is located outside of the earbuds 110, and preferably, may be located at a predetermined distance from the mouth of the user, i.e. in a position suitable for acquiring the voice of the user. In the case of a neckband type ear-set device, a suitable position for the second microphone 130 may be a position on the body of the neckband. In the case of a typical wire type ear-set device, the second microphone 130 may be located on a wire.

The first audio signal acquired using the first microphone 120 may be used to authenticate the user wearing the ear-set device 100. The second microphone 130 is a typical microphone, and the second audio signal acquired using the second microphone 130 is an external signal acquired using a typical microphone.

The first audio signal for user authentication means a signal resonating in the ear of the user or a signal acquired using a device attached to the body of the user to be used for a special purpose, such as detecting a signal due to vibrations of the vocal cords within the neck.

The first audio signal does not respond to the other sounds, except for those produced by the user, or even in the case of responding to the other sounds, can be clearly distinguished from a signal produced by the utterance of the user. When the first audio signal is used, only the voice of the user can be distinguished even in a situation in which two or more persons are conversing together. In particular, the start point and the end point of the utterance of the user can be accurately detected.

Specifically, when the first audio signal is used, the problem of interference due to the voice of the counterpart can be removed, since a case in which the counterpart speaks can be accurately determined. In addition, as will be described later, an utterance period, including a start point and an end point of the utterance of the user, can be accurately detected (end point detection; EPD), and a pause period can also be accurately detected. Accordingly, an external noise signal occurring in the pause period can be selectively extracted and the type of the extracted noise signal can be determined, so that an acoustic model specialized to the corresponding noise can be used.

Referring to FIG. 3, the Bluetooth chipset (CSR8670) 140 of the ear-set device 100 according to exemplary embodiments includes an audio interface module 141, an advanced RISK machine (ARM) processor (STM32L) 142, a digital signal processor (DSP) module 143, and a Bluetooth module 144.

The audio interface module 141 receives first and second audio signals, as a dual-channel audio signal acquired using the first and second microphones 120 and 130. The dual-channel audio signal is output to an I²S digital audio terminal via the audio interface module 141.

Although all of current Bluetooth chipsets allow dual-microphone input, only a mono signal is transmitted to the Bluetooth module 144 by a hands-free profile (HFP) protocol while passing through the DSP module 143.

Accordingly, the ear-set device 100 according to exemplary embodiments can convert the dual-channel audio signal comprised of the first and second audio signals into the mono signal by replacing an existing hands-free profile with the ARM processor 142 using a serial port profile (SPP) protocol designed for data communications.

The mono signal may be converted by the ARM processor 142 so as to alternate in bytes, as illustrated in FIG. 4. The mono signal may be configured by allocating the first audio signal with "0" byte and the second audio signal with "1" byte. Voice coding may be applied to the converted mono signal to prevent interference with nearby Bluetooth signals and improve the transfer rate.

The mono signal, configured as described above, can be input to a UART terminal and be transmitted to the automatic translation device 200 via the Bluetooth module 144.

The detailed hardware specification of the ear-set device 100 is merely an embodiment, and any specification able to perform the above-described function by combining a variety of configurations having different specifications may be used.

Hereinafter, the automatic translation device 200 according to exemplary embodiments will be described.

Figure 5:
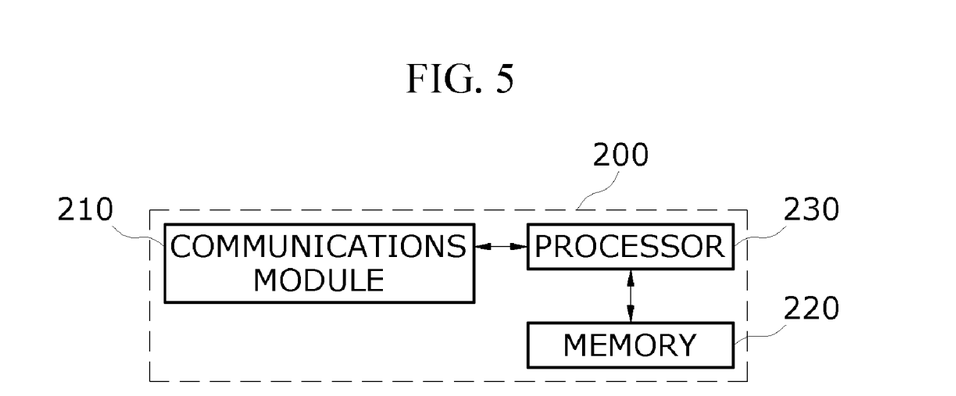
FIG. 5 is a block diagram illustrating an automatic translation device according to exemplary embodiments.

FIG. 5 is a block diagram illustrating the automatic translation device 200 according to exemplary embodiments.

The automatic translation device 200 according to exemplary embodiments includes a communications module 210, a memory 220, and a processor 230.

The communications module 210 transmits and receives data to and from an automatic translation device 200 of the user's counterpart. The communications module 210 may be a wired communications module and/or a wireless communications module. The wired communications module may be implemented as a public switched telephone network (PSTN) communications device, multimedia over coax alliance (MoCA), Ethernet, IEEE1294, an integrated cable home network, an RS-485 control device, or the like. In addition, the wireless communications module may be implemented as wireless LAN (WLAN), Bluetooth, HDR WPAN, UWB, ZigBee, impulse radio (or ultra-wideband), 60 GHz WPAN, binary-CDMA, wireless USB technology, wireless HDMI technology, or the like.

A program for generating a result of translation using the dual-channel audio signal is stored in the memory 220. The memory 220 is a generic term referring to a nonvolatile memory device continuously maintaining data stored therein even in the case that power is not supplied thereto, as well as a volatile memory device.

For example, the memory 220 may be one selected from among, but is not limited to, NAND flash memories, such as a compact flash (CF) card, a secure digital (SD) card, a memory stick, a solid-state drive (SSD), and a micro SD card; magnetic computer storage devices, such as a hard disk drive (HDD); and optical disc drives, such as compact disc read-only memory (CD-ROM) and digital versatile disc read-only memory (DVD-ROM).

The processor 230 can execute the program stored in the memory 220. Specifically, when the mono signal is received by the communications module 210 from the ear-set device 100, the processor 230 restores the mono signal to the first and second audio signals of the original dual-channel audio signal.

Then, automatic translation is performed by entirely or selectively extracting voice signals of the user contained the first and second audio signals, based on a result of comparison of the first and second audio signals.

Figure 6:
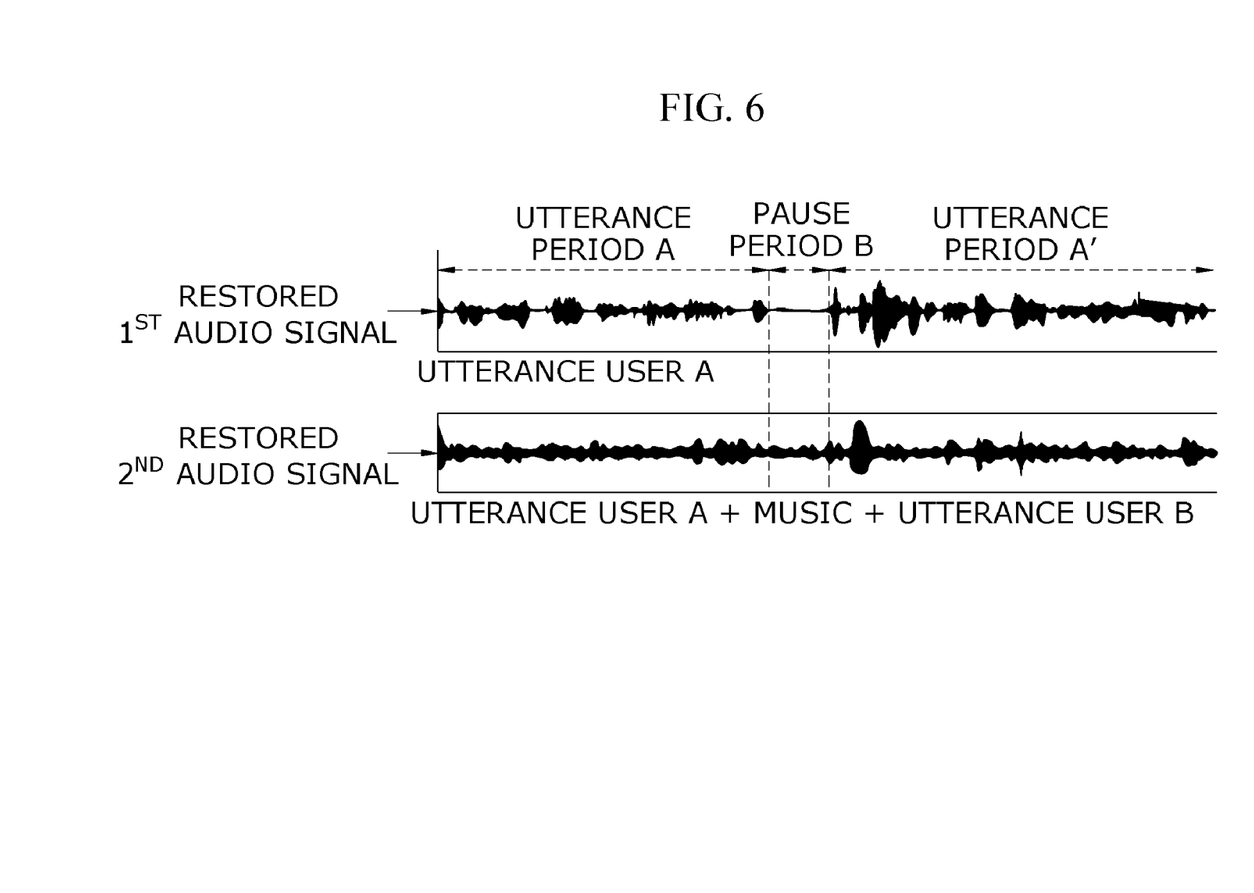
FIG. 6 is a waveform diagram illustrating samples of voice waveforms restored to a dual-channel audio signal.

FIG. 6 is a waveform diagram illustrating samples of voice waveforms restored to a dual-channel audio signal.

In the dual-channel audio signal, a first audio signal is a signal acquired using the first microphone 120 located inside of the earbud 110 of the ear-set device 100, whereas a second audio signal is a signal acquired using the second microphone 130 located outside of the ear-set device 100.

As described above, the second audio signal contains not only the voice of the user, but also the voices of nearby persons and noise, due to the characteristics of the second microphone 130 located outside of the earbud 110.

In contrast, the first audio signal is acquired using the first microphone 120 located inside of the earbud 110. Thus, the first audio signal is relatively independent of external noise, regardless of the low signal level thereof, so that only the voice of the user is acquired.

FIG. 6 illustrates waveforms of a dual-channel audio signal restored in the automatic translation device 200 of "user A," acquired by the ear-set device of "user A," when "user A" and "user B" converse together in an indoor space in which music is heard.

It is appreciated that the second audio signal contains voice signals of "user A," voice signals of "user B," and the sound of music, which are mixed so as not to be distinguishable. In contrast, the first audio signal only contains the recorded voice signals of "user A." In addition, in the first audio signal, a pause period B between utterance periods A and A' of "user A" can be clearly distinguished.

The processor 230 can detect the utterance periods A and A' and the pause period B of the user from the first audio signal, detect a noise signal in the second audio signal, corresponding to the detected pause period B of the first audio signal, and extract the voice signals of the user, based on the signal-to-noise ratio (SNR) of the detected noise signal.

Due to such characteristics, the first audio signal can be used to recognize the utterance of the user. When the second audio signal corresponding to the pause period of the first audio signal is used, it is possible to detect the strength and type of noise in the current surrounding environment.

When the utterance and pause periods of the user are detected using the first audio signal, the processor 230 calculates the SNR of the detected noise signal in the second audio signal, based on Formula 1.

$$SNR_{db} = 20\log10\left(\frac{S_{rms}}{N_{rms}}\right)$$
$$S_{rms} = \sqrt{\frac{1}{n\sum_s [n]^2}}$$

Formula 1

In Formula 1, $S_{rms}$ and $N_{rms}$ indicate the mean square roots of a voice signal and a noise signal, respectively.

To calculate an SNR from a mono signal, the noise period of the signal must be accurately detected. Since voice signals and noise signals are mixed in the mono signal, frequently, it is difficult to accurately detect utterance and noise periods.

In contrast, since a dual-channel audio signal is used according to exemplary embodiments, the utterance period and the noise period can be accurately detected. It is thereby possible to determine the noise state of a signal by accurately calculating the SNR.

The calculated SNR may be categorized as three environmental noise states. When the SNR (e.g. 5 dB to 15 dB) is in a preset range, the audio signal may be categorized as containing noise. When the SNR (e.g. 0 dB to 5 dB) is lower than the preset range, the audio signal may be categorized as containing strong noise. When the SNR (e.g. 15 dB to 20 dB) is higher than the preset range, the audio signal may be categorized as a clear voice.

According to the categorized states, the processor 230 can use the first audio signal and the second audio signal as inputs for final speech recognition by apply weighted-summing, as expressed in Formula 2, thereto.

$$s(n)=\alpha*s_{m1}(n)+(1-\alpha)*s_{m2}(n)$$

Formula 2

In Formula 2, $\alpha$ is a weighting factor, where $0\leq\alpha\leq1$. $S_{m1}$ is a first audio signal, and $s_{m2}$ is a second audio signal.

When the SNR is higher than the preset range, i.e. the audio signal is categorized as a clear voice, the processor 230 sets the weighting factor $\alpha$ to zero (0). Consequently, the processor 230 can extract a voice signal of the user from the second audio signal to be used as an input value for final speech recognition.

In addition, when the SNR of the noise signal is lower than the preset range, i.e. the audio signal is categorized as containing strong noise, the processor 230 sets the weighting factor $\alpha$ to 1. Consequently, the processor 230 can extract a voice signal of the user from the first audio signal to be used as an input value for final speech recognition.

Since the first audio signal is acquired using the first microphone 120 provided inside of the earbud 110, the sound quality thereof is significantly lower than that of the second audio signal acquired using the second microphone 130 provided outside of the earbud 110. Accordingly, when the first audio signal is used alone for speech recognition, the performance of speech recognition may be degraded.

However, in a strong noise environment with the SNR ranging from 0 dB to 5 dB, speech recognition using the second audio signal is almost impossible. In contrast, when the first audio signal is used, speech recognition is possible even if the performance of speech recognition is lowered. Accordingly, the use of the first audio signal can advantageously acquire a predetermined level of speech recognition in a strong noise environment.

In addition, when the SNR of the noise signal is in the preset range, the processor 230 can consider an SNR value such that the weighting factor is a value rather than 0 or 1 and use two signals by weighted-summing. In this case, the weighting factor $\alpha$ may be set to be proportional to the SNR value within the preset range.

Samples of the two audio signals must be accurately identical in the utterance and non-utterance periods thereof, so that the audio signals can be used as input values of final speech recognition after being simply weighted-summed. Since the dual-channel audio signal according to exemplary embodiments is generated such that samples thereof are identical to each other, the two signals are accurately identical even in the case in which the signals are weighted-summed.

Due to the above-described characteristics, the processor 230 can extract a voice signal of the user from the weighted-summed first and second audio signals, by analyzing the period of second audio signal corresponding to the pause period of the first audio signal.

Here, when one or more noises are contained in the noise signal, the processor 230 can generate acoustic models corresponding to types of the plurality of noises.

In general, the performance of speech recognition is optimized when the audio environment of an input signal and the audio environment of a speech recognition model are the same. It is theoretically possible to provide a speech recognition system optimized to an audio environment by construct a plurality of audio environment-specific acoustic models and selectively use the acoustic models according to the audio environment of an input signal.

However, the audio environment of the input signal cannot be determined in advance unless utterance periods and non-utterance periods are accurately determined. When the utterance and non-utterance periods are erroneously determined, the performance of speech recognition may further be lowered.

In addition, once the acoustic model is determined, the acoustic model cannot be changed during the process of speech recognition. Accordingly, existing speech recognition systems using only a single acoustic model.

In contrast, the automatic translation device 200 according to exemplary embodiments can determine the audio environment by raising the accuracy of the non-utterance period of an input signal by analyzing the dual-channel audio signal of the input signal, thereby determining an acoustic model specialized to the audio environment while overcoming the problems of the related art.

For reference, the constitutional components according to exemplary embodiments, illustrated in FIG. 5, may be provided as software or hardware components, such as a field programmable gate array (FPGA) or an application-specific integrated circuit (ASIC), to perform specific functions.

However, the constitutional components are not limited to software or hardware, but the respective constitutional components may be configured to reside in an addressable storage medium or may be configured to run on one or more processors.

For example, the constitutional components may include software components, object-oriented software components, class components, task components, processes, functions, factors, procedures, subroutines, program code segments, drivers, firmware, micro-codes, circuits, data, database, data structures, tables, arrays, and variables.

The constitutional components, as well as functions provided by the corresponding constitutional components, may be combined to form a smaller number of constitutional components or may be further divided into additional components.

Hereinafter, the automatic translation method using a dual-channel audio signal in the automatic translation device 200 according to exemplary embodiments will be described with reference to FIGS. 7 and 8.

Figure 7:
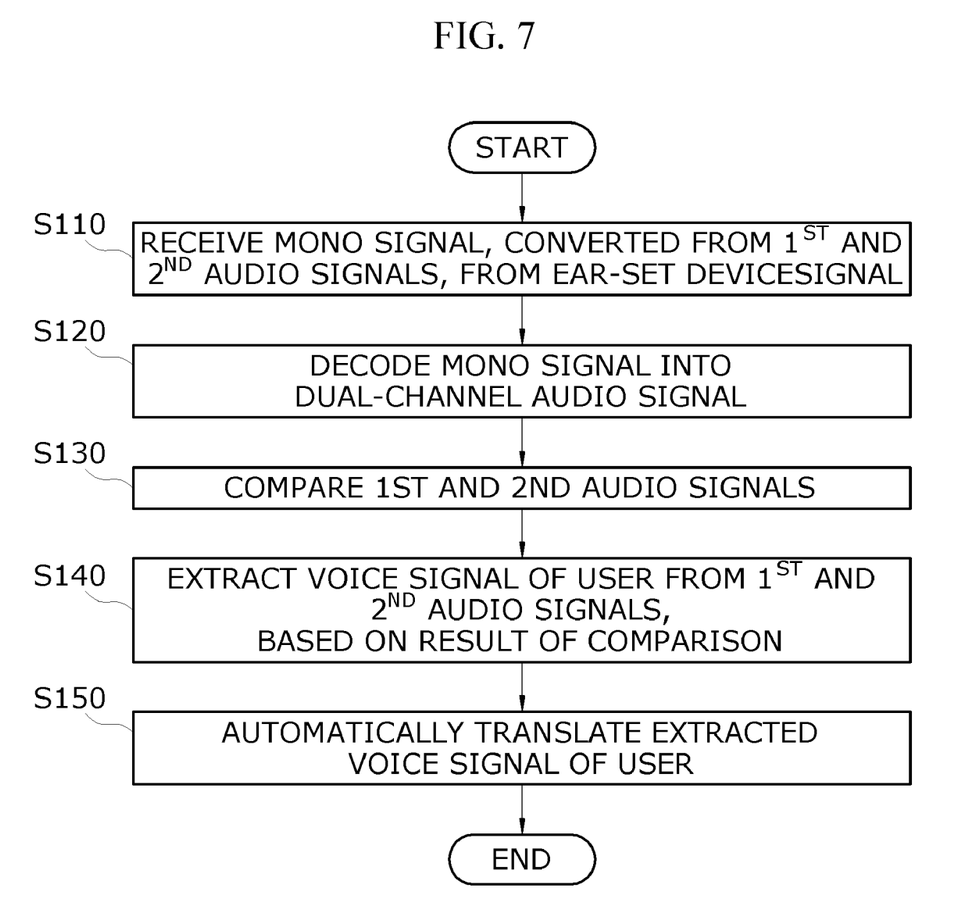
FIG. 7 is a flowchart illustrating an automatic translation method according to exemplary embodiments.
Figure 8:
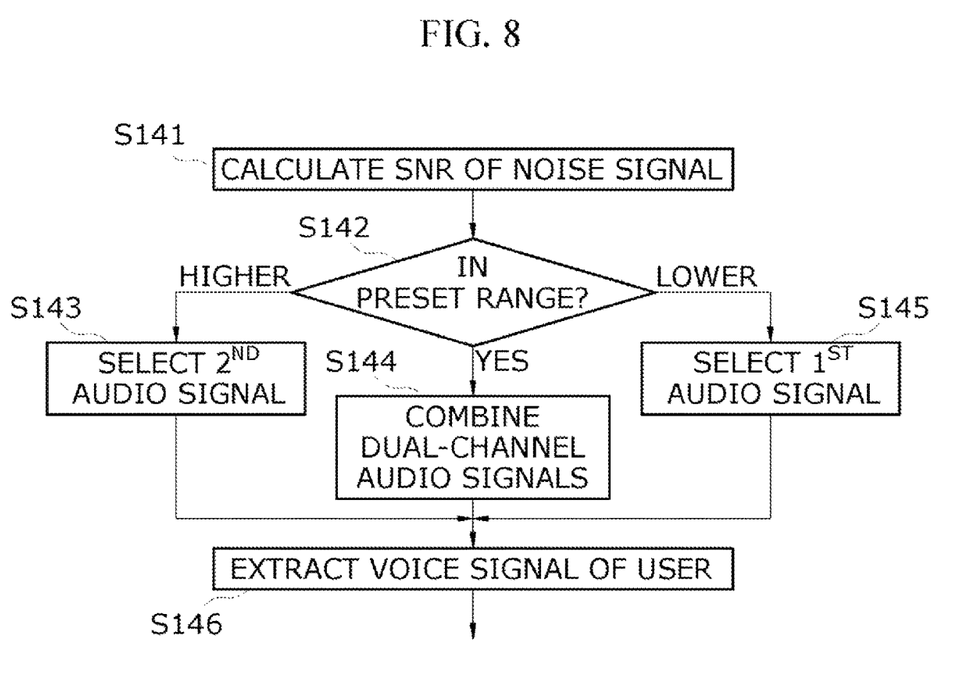
FIG. 8 is a flowchart illustrating a process of extracting a voice signal of a user by entirely or selectively applying first and second audio signals.

FIG. 7 is a flowchart illustrating the automatic translation method according to exemplary embodiments, and FIG. 8 is a flowchart illustrating a process of extracting voice signals of a user by entirely or selectively applying first and second audio signals.

The automatic translation method according to exemplary embodiments, first, receives a mono signal, produced by converting first and second audio signals, from the ear-set device 100 in S110, and then decodes the mono signal to a dual-channel audio signal comprised of the first and second audio signals in S120.

The first audio signal contains the voice of the user, received using the first microphone 120 located inside of the earbud 110 of the ear-set device 100, whereas the second audio signal contains noise signal and the voice of the user, received using the second microphone 120 located outside of the earbud 110.

Afterwards, the first and second audio signals are compared in S130, and based on a result of the comparison, voice signals of the user are entirely or selectively extracted from the first and second audio signals in S140.

In the step of comparing the first and second audio signals, utterance and pause periods of the user are detected from the first audio signal, and a noise signal in the second audio signal, corresponding to the detected pause period, is detected.

Afterwards, voice signals of the user are extracted, based on the SNR of the detected noise signal in S141. Specifically, if it is determined that the SNR of the detected noise signal is included in a preset range in S142, the first and second audio signals are weighted-summed in S144, so that the voice signals of the user can be extracted from the weight-summed first and second audio signals in S146.

In contrast, when the SNR of the detected noise signal is higher than the preset range, voice signals of the user are extracted from the second audio signal in S143 and S146. When the SNR of the detected noise signal is lower than the preset range, voice signals of the user are extracted from the first audio signal in S145 and S146.

Afterwards, in S150, the extracted voice signals of the user are automatically translated.

In the above-described steps, steps S110 to S150 may further be divided into additional steps or combined to form a smaller number of steps, depending on implementations of the present disclosure. In addition, some steps may be omitted as required, or the sequence of the steps may be changed. Furthermore, the features described above regarding the automatic translation system 1 and the automatic translation device 200 with reference to FIGS. 1 and 6 are applicable to the automatic translation method illustrated in FIG. 7 and FIG. 8, even if repeated descriptions thereof are omitted.

Although the method and system of the present disclosure have been described in connection with the specific embodiments, some or all of the components or operations thereof may be realized using a computer system having general-use hardware architecture.

The foregoing description of the present disclosure has been provided for illustrative purposes, a person skilled in the art will appreciate that other specific modifications can be easily made without departing from the technical spirit or essential features of the present disclosure. Therefore, the foregoing embodiments shall be interpreted as illustrative, while not being limiting, in all aspects. For example, some components, each of which has been described as being a single form, can be implemented in the distributed form, whereas other components, which have been described as being distributed, can be implemented in a combined form.

The scope of the present disclosure is not defined by the detailed description as set forth above but by the appended Claims. It should also be understood that all changes or modifications derived from the definitions and scopes of the Claims and their equivalents fall within the scope of the present disclosure.

What is claimed is:

1. An automatic translation device comprising:
  a communications module transmitting and receiving data to and from an ear-set device including a speaker, a first microphone, and a second microphone;
  a memory storing a program generating a result of translation using a dual-channel audio signal; and
  a processor executing the program stored in the memory,
  wherein, when the program is executed, the processor compares a first audio signal comprising a voice signal of a user, received using the first microphone, with a second audio signal comprising a noise signal and the voice signal of the user, received using the second microphone, and entirely or selectively extracting the voice signal of the user from the first and second audio signals, based on a result of the comparison, to perform automatic translation,
  wherein the first microphone is located inside of an earbud of the ear-set device, and
  the second microphone is located outside of the earbud of the ear-set device, within a predetermined distance from the mouth of the user.

2. The automatic translation device according to claim 1, wherein the first and second audio signals are converted into a mono signal in the ear-set device, the mono signal being received by the communications module, and
  the processor decodes the mono signal to extract the first and second audio signals of the dual-channel audio signal.

3. The automatic translation device according to claim 1, wherein the processor detects an utterance period and a pause period of the user from the first audio signal, detects the noise signal from the second audio signal, in a period corresponding to the detected pause period, and extracts the voice signal of the user, based on a signal-to-noise ratio of the detected noise signal.

4. The automatic translation device according to claim 3, wherein, when the signal-to-noise ratio of the noise signal is in a preset range, the processor weighted-sums the first and second audio signals, thereby extracting the voice signal of the user from the weighted-summed first and second audio signals.

5. The automatic translation device according to claim 4, wherein, when the noise signal contains a plurality of noises, the processor generates the acoustic models corresponding to types of the noises, respectively, and performs the automatic translation using the acoustic models.

6. The automatic translation device according to claim 3, wherein, when the signal-to-noise ratio of the noise signal is higher than the preset range, the processor extracts the voice signal of the user from the second audio signal to perform the automatic translation.

7. The automatic translation device according to claim 3, wherein, when the signal-to-noise ratio of the noise signal is lower than the preset range, the processor extracts the voice signal of the user from the first audio signal to perform the automatic translation.

8. An automatic translation method comprising:
receiving first and second audio signals, converted into a mono signal, from an ear-set device of an automatic translation device;
decoding the mono signal to a dual-channel audio signal comprised of the first and second audio signals;
comparing the first and second audio signals;
entirely or selectively extracting a voice signal of a user from the first and second audio signals, based on a result of the comparison; and
automatically translating the extracted voice signal of the user,
wherein the first audio signal contains the voice signal of the user, received using a first microphone of the ear-set device, and the second audio signal contains a noise signal and the voice signal of the user, received using a second microphone of the ear-set device,
wherein the first microphone is located inside of the ear-set device, and
the second microphone is located outside of the earbud at a predetermined distance from the mouth of the user.

9. The automatic translation method according to claim 8, wherein comparing the first and second audio signals comprises:
detecting an utterance period and a pause period of the user from the first audio signal; and
detecting the noise signal from the second audio signal, in a period corresponding to the detected pause period.

10. The automatic translation method according to claim 9, wherein the voice signal of the user is entirely or selectively extracted from the first and second audio signals, based on a signal-to-noise ratio of the detected noise signal.

11. The automatic translation method according to claim 10, wherein entirely or selectively extracting the voice signal of the user from the first and second audio signals comprises:
determining whether or not the signal-to-noise ratio of the noise signal is in a preset range;
weighted-summing the first and second audio signals when the signal-to-noise ratio of the noise signal is in the preset range; and
extracting the voice signal of the user from the weighted-summed first and second audio signals.

12. The automatic translation method according to claim 11, further comprising wherein, when the noise signal comprises a plurality of noises, generating the acoustic models corresponding to types of the noises, respectively.

13. The automatic translation method according to claim 10, wherein entirely or selectively extracting the voice signal of the user from the first and second audio signals comprises:
determining whether or not the signal-to-noise ratio of the noise signal is in a preset range; and
when the signal-to-noise ratio of the noise signal is determined to be higher than a preset range, extracting the voice signal of the user from the second audio signal.

14. The automatic translation method according to claim 10, wherein entirely or selectively extracting the voice signal of the user from the first and second audio signals comprises:
determining whether or not the signal-to-noise ratio of the noise signal is in a preset range; and
when the signal-to-noise ratio of the noise signal is determined to be lower than a preset range, extracting the voice signal of the user from the first audio signal.

15. An automatic translation system comprising:
an ear-set device receiving a first audio signal comprising a voice signal of a user, using a first microphone located inside of an earbud of the ear-set device, receiving a second audio signal comprising a noise signal and the voice signal of the user, using a second microphone located outside of the earbud, within a predetermined distance from the mouth of the user, and converting the first and second audio signals to a mono signal to transfer the mono signal; and
an automatic translation device receiving the mono signal, extracting the first and second audio signals as a dual-channel audio signal from the mono signal, and entirely or selectively extracting the voice signal of the user from the first and second audio signals, based on a result of comparing the first and second audio signals, to perform automatic translation.

16. The automatic translation system according to claim 15, wherein the automatic translation device detects an utterance period and a pause period of the user from the first audio signal, detects the noise signal from the second audio signal, in a period corresponding to the detected pause period, and extracts the voice signal of the user from the first and second audio signals, based on a signal-to-noise ratio of the detected noise signal.

17. The automatic translation system according to claim 16, wherein, when a signal-to-noise ratio of the noise signal is in a preset range, the automatic translation device weighted-sums the first and second audio signals, thereby extracting the voice signal of the user from the weighted-summed first and second audio signals.

18. The automatic translation system according to claim 16, wherein, when the signal-to-noise ratio of the noise signal is higher than the preset range, the automatic translation device extracts the voice signal of the user from the second audio signal to perform the automatic translation, and
when the signal-to-noise ratio of the noise signal is lower than the preset range, the automatic translation device extracts the voice signal of the user from the first audio signal to perform the automatic translation.

* * * * *